Dec. 20, 1949     C. P. CARLSON     2,491,644
ATTENUATOR

Filed Aug. 24, 1945     2 Sheets-Sheet 1

INVENTOR
C. P. CARLSON
BY
Ralph T. Holcomb
ATTORNEY

Dec. 20, 1949     C. P. CARLSON     2,491,644
ATTENUATOR

Filed Aug. 24, 1945     2 Sheets-Sheet 2

INVENTOR
C. P. CARLSON
BY
Ralph T. Holcomb
ATTORNEY

Patented Dec. 20, 1949

2,491,644

UNITED STATES PATENT OFFICE 2,491,644

ATTENUATOR

Carl P. Carlson, Tenafly, N. J., assignor to Bell Telephone Laboratories, Incorporated, New York, N. Y., a corporation of New York Application August 24, 1945, Serial No. 612,394

13 Claims. (Cl. 178—44)

This invention relates to attenuators and more particularly to variable attenuators for use with wave guides.

The principal object of the invention is to attenuate electromagnetic energy flowing in a hollow wave guide. Other objects are to make the attenuation in decibels of a variable wave guide attenuator substantially proportional to the angular rotation of a resistive element and to increase the maximum attenuation obtainable.

The variable wave guide attenuator in accordance with the present invention comprises a straight, hollow wave guide having a longitudinal slot in a wall thereof and a rotatable resistive vane mounted so that its edge projects through the slot into the guide. The contour of the vane deviates from the arc of a circle in such a way that the attenuation in decibels is substantially proportional to the angle through which the vane is rotated. In this way, congested regions in the attenuation scale are avoided, permitting a more accurate setting of the attenuator. To increase the maximum attenuation obtainable the vane may cut clear through the guide and emerge through a second slot in the wall.

The nature of the invention will be more fully understood from the following detailed description and by reference to the accompanying drawing, in which like reference characters refer to similar or corresponding parts and in which.

Figure 1:
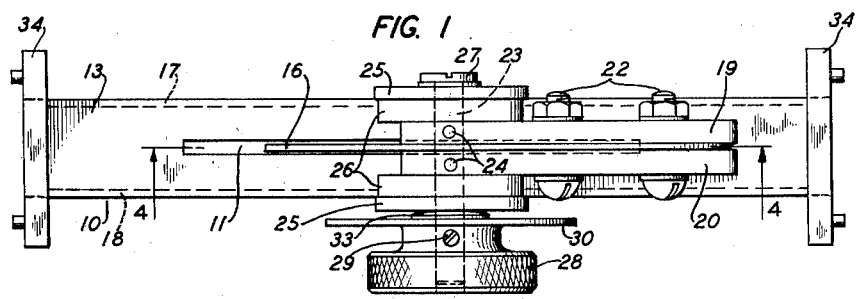
Fig. 1 is a top view of a two-slot wave guide attenuator in accordance with the invention.
Figure 2:
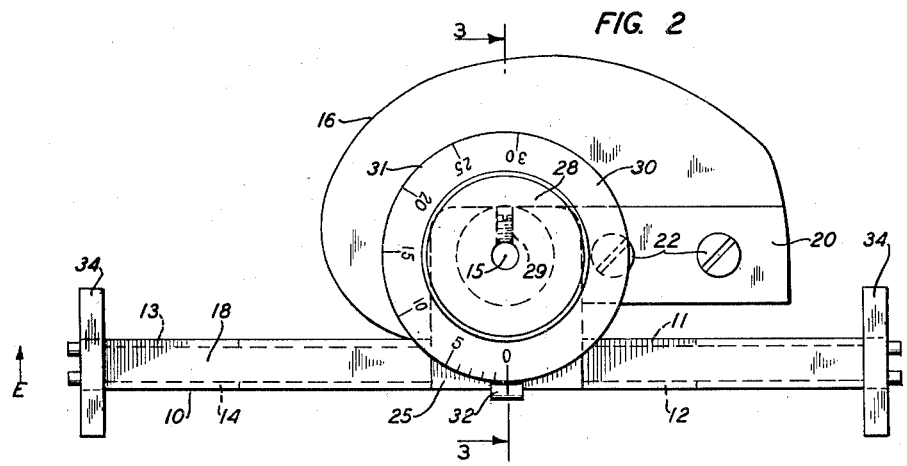
Fig. 2 is a side view thereof.
Figures 3, 4:
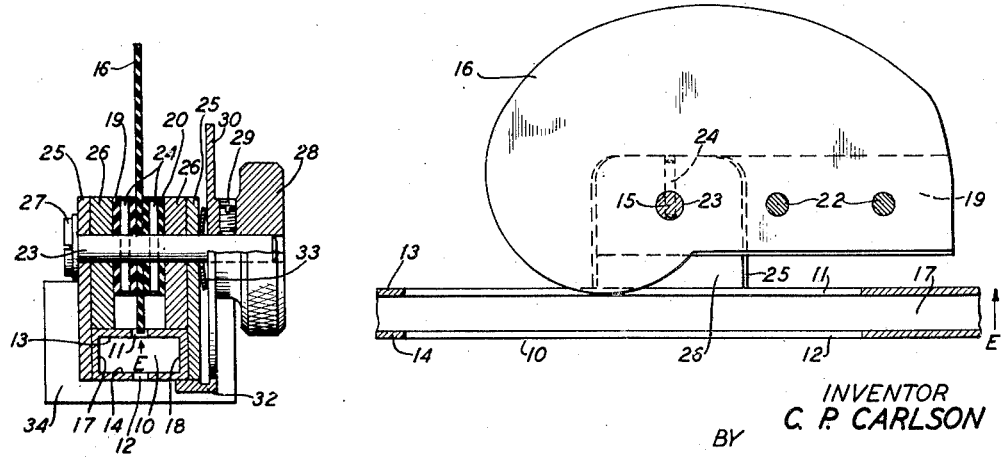
Fig. 3 shows a transverse cross-section taken on the line 3—3 of Fig. 2.
Fig. 4 shows a partial longitudinal cross-section taken on the line 4—4 of Fig. 1.

The variable wave guide attenuator shown in Figs. 1, 2, 3 and 4 comprises a hollow, straight wave guide 10 having two oppositely disposed slots 11 and 12 in the opposite sides 13 and 14, respectively, and a resistive vane 16 rotatably mounted about the pivot point 15 so that its edge will enter the guide 10 through the upper slot 11 and emerge through the lower slot 12. The vane 16 is preferably positioned parallel to the transverse electric field of the electromagnetic waves to be attenuated. In the guide 10, which is of rectangular cross-section with unequal cross-sectional dimensions, this field is ordinarily parallel to the narrower sides 17 and 18, as indicated by the arrow E in Figs. 2, 3 and 4. The slots 11 and 12 are, therefore, in the wider sides 13 and 14 and are preferably centrally located so that the vane 16 will be in the most intense portion of the field.

The vane 16 is clamped between the two blocks 19 and 20 by the bolts 22 and secured to the shaft 23 by the pins 24. The shaft 23, which has a head 27, turns in bearings in the two upright supports 25, secured to the sides 17 and 18 of the guide 10. The edge of the vane 16 is centered in the slots 11 and 12 by means of the spacers 26. A knob 28 attached to the shaft 23 by a set screw 29 facilitates turning. A dial 30 attached to the knob 28 has a scale 31 calibrated in decibels upon which the attenuation introduced may be read at the index 32. A spring washer 33 between the dial 30 and the support 25 takes up end play in the shaft 23. The end flanges 34 are provided for connecting the guide 10 to other sections of wave guide.

As shown in the drawing, the vane 16 is entirely withdrawn from the interior of the guide 10 and the attenuation reading is zero. To introduce attenuation, the vane 16 is rotated in a counter-clockwise direction about the pivot point 15 by means of the knob 28. The edge of the vane 16 enters the guide 10 through the upper slot 11, passes all the way across the guide, and eventually comes out through the lower slot 12 on the other side. Permitting the vane 16 to extend clear through the guide increases the maximum attenuation obtainable with the attenuator. The contour of the vane 16 preferably so deviates from the arc of a circle that the attenuation in decibels introduced is substantially proportional to the angle through which the vane is rotated. Congested regions in the scale 31 are thus avoided and more accurate attenuation settings are possible.

Figure 5:
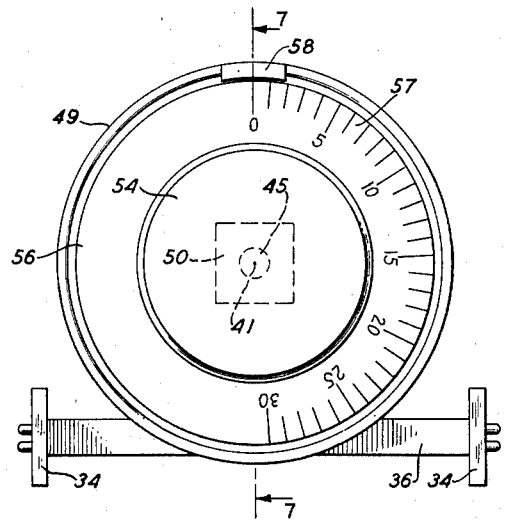
Fig. 5 is a side view of another attenuator in accordance with the invention, employing only a single slot.
Figure 6:
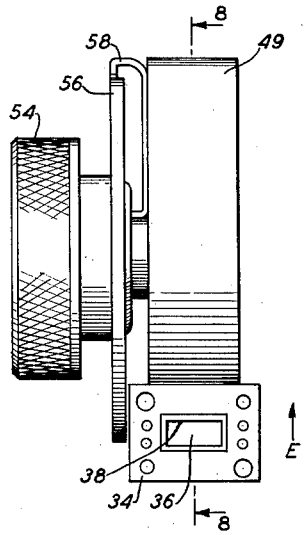
Fig. 6 is an end view of the attenuator of Fig. 5.
Figure 7:
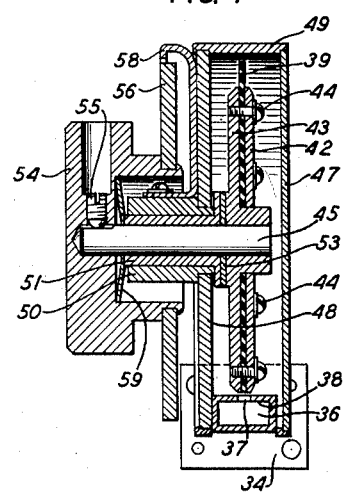
Fig. 7 shows a transverse cross-section taken on the line 7—7 of Fig. 5.
Figure 8:
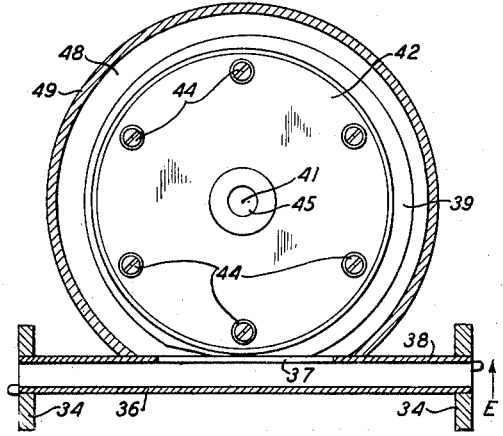
Fig. 8 is a longitudinal cross-section taken on the line 8—8 of Fig. 6.

Figs. 5, 6, 7 and 8 show a modified embodiment of a variable wave guide attenuator in accordance with the invention in which the guide has only a single slot. The attenuator comprises a straight, hollow, rectangular wave guide 36 having a slot 37 centrally located in one of the wider sides 38 and a resistive vane 39 mounted for rotation about the pivot point 41 so that its edge will project through the slot 37 into the interior of the guide 36.

The vane 39 is clamped between two circular plates 42 and 43 by means of six screws 44 and the assembly is secured to the inner end of the shaft 45. This assembly is enclosed in a metallic shield formed of the two circular plates 47 and 48 and a short cylinder 49 securely attached at its base to the guide 36. The plate 48 carries a journal box 50 in which rotates the flanged cylindrical bearing 51 surrounding a portion of the shaft 45. The edge of the vane 39 is centered in the slot 37 by the washer 53. A knob 54 attached to the outer end of the shaft 45 by a set screw 55 carries a dial 56 with a scale 57, calibrated in decibels of attenuation, which may be read at the index 58. A spring washer 59 between the bearing 51 and the knob 54 prevents end play in the shaft 45.

As shown in Figs. 5, 6, 7 and 8 the attenuator is set at zero and therefore the vane 39 is entirely withdrawn from the guide 36. However, as the knob 54 is turned in a counter-clockwise direction the edge of the vane 39 gradually passes through the slot 37 into the interior of the guide 36 and the attenuation is increased correspondingly. In this attenuator, also, the contour of the vane 39 preferably so deviates from the arc of a circle that the attenuation in decibels is a substantially linear function of the angular rotation.

What is claimed is:

1. A variable attenuator for electromagnetic waves comprising a hollow wave guide having a longitudinal slot in a wall thereof, a rotatable resistive vane mounted so that its edge projects through said slot into said guide, and a metallic shield enclosing said vane, the contour of said vane so deviating from the arc of a circle that the attenuation in decibels is substantially proportional to the angular rotation of said vane.

2. An attenuator in accordance with claim 1 in which said guide has a substantially straight longitudinal axis.

3. An attenuator in accordance with claim 1 which includes a second slot in the wall of said guide, said slots being oppositely disposed and said vane being so shaped that, upon rotation, it cuts clear through said guide and emerges through said second slot.

4. An attenuator in accordance with claim 1 in which said vane is parallel to the transverse electric field of the electromagnetic waves to be attenuated.

5. An attenuator in accordance with claim 1 in which said guide is of rectangular cross-section and said slot is centrally located in one of the sides thereof.

6. An attenuator in accordance with claim 1 in which said guide is of rectangular cross-section with unequal cross-sectional dimensions and said slot is in one of the wider sides thereof.

7. An attenuator in accordance with claim 1 in which said guide is of rectangular cross-section with unequal cross-sectional dimensions and said slot is centrally located in one of the wider sides thereof.

8. A variable attenuator for electromagnetic waves comprising a hollow wave guide having two oppositely disposed longitudinal slots in the wall thereof and a rotatable resistive vane mounted so that, upon rotation, its edge enters said guide through one of said slots and emerges therefrom through the other of said slots.

9. An attenuator in accordance with claim 8 in which the contour of said vane is so shaped that the attenuation in decibels is substantially proportional to the angular rotation of said vane.

10. An attenuator in accordance with claim 8 in which said vane is parallel to the transverse electric field of the electromagnetic waves to be attenuated.

11. An attenuator in accordance with claim 8 in which said guide is of rectangular cross-section and said slots are centrally located in opposite sides thereof.

12. An attenuator in accordance with claim 8 in which said guide is of rectangular cross-section with unequal cross-sectional dimensions and said slots are in the wider sides thereof.

13. An attenuator in accordance with claim 8 in which said guide is of rectangular cross-section with unequal cross-sectional dimensions and said slots are centrally located in the wider sides thereof.

CARL P. CARLSON.

REFERENCES CITED

The following references are of record in the file of this patent:

UNITED STATES PATENTS

| Number | Name | Date |
|---|---|---|
| 2,151,157 | Schelkunoff | Mar. 21, 1939 |